(12) United States Patent
Rentschler

(10) Patent No.: US 11,050,501 B2
(45) Date of Patent: Jun. 29, 2021

(54) PERFORMING PHY-LEVEL HARDWARE TIMESTAMPING AND TIME SYNCHRONIZATION IN COST-SENSITIVE ENVIRONMENTS

(71) Applicant: Microchip Technology Incorporated, Chandler, AZ (US)

(72) Inventor: Michael Rentschler, Karlsruhe (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/440,775

(22) Filed: Jun. 13, 2019

(65) Prior Publication Data

US 2019/0386763 A1 Dec. 19, 2019

Related U.S. Application Data

(60) Provisional application No. 62/684,806, filed on Jun. 14, 2018.

(51) Int. Cl.
*H04J 3/06* (2006.01)
*H04L 12/26* (2006.01)

(52) U.S. Cl.
CPC ........ *H04J 3/0688* (2013.01); *H04L 43/0829* (2013.01); *H04L 43/106* (2013.01)

(58) Field of Classification Search
CPC ...... H04J 3/0667; H04J 3/0673; H04J 3/0664; H04J 3/0697; H04J 3/0635; H04J 3/0658; H04J 3/0661
See application file for complete search history.

(56) References Cited

U.S. PATENT DOCUMENTS

| | | | |
|---|---|---|---|
| 2009/0190613 A1 | 7/2009 | Finn | 370/509 |
| 2011/0051754 A1 | 3/2011 | Lansdowne | 370/503 |
| 2011/0310901 A1* | 12/2011 | Uchida | H04L 43/026 370/392 |
| 2013/0034197 A1* | 2/2013 | Aweya | H03L 7/0991 375/362 |

(Continued)

FOREIGN PATENT DOCUMENTS

WO 2017/177751 A1 10/2017 ............. H04L 7/00

OTHER PUBLICATIONS

International Search Report and Written Opinion, Application No. PCT/US2019/037152, 14 pages, dated Sep. 20, 2019.

*Primary Examiner* — Jung H Park
(74) *Attorney, Agent, or Firm* — Slayden Grubert Beard PLLC

(57) ABSTRACT

A microcontroller includes a packet matching circuit, a hardware timer circuit, and a processor. The packet matching circuit is configured to match contents of received packets to the microcontroller and identify whether a packet has been received. The hardware timer circuit is configured to provide a synchronization timestamp based on a signal from the packet matching circuit that a synchronization packet has been matched, and provide a follow-up timestamp based on a signal from the packet matching circuit that a follow-up packet has been matched after reception of the synchronization packet. The processor is configured to adjust a clock base to determine a synchronized clock base based upon the synchronization timestamp and upon the follow-up timestamp.

17 Claims, 4 Drawing Sheets

(56) References Cited

U.S. PATENT DOCUMENTS

| | | | |
|---|---|---|---|
| 2014/0247892 A1* | 9/2014 | Williams | H04B 3/54 |
| | | | 375/257 |
| 2014/0269672 A1 | 9/2014 | Zampetti | 370/350 |
| 2015/0071309 A1* | 3/2015 | Aweya | H04J 3/0682 |
| | | | 370/503 |
| 2015/0092797 A1 | 4/2015 | Aweya | 370/516 |
| 2017/0366287 A1* | 12/2017 | Zeng | H04J 3/0667 |
| 2018/0013508 A1* | 1/2018 | Rabinovich | H04J 3/0667 |

\* cited by examiner

PERFORMING PHY-LEVEL HARDWARE TIMESTAMPING AND TIME SYNCHRONIZATION IN COST-SENSITIVE ENVIRONMENTS

PRIORITY

This application claims priority to U.S. Provisional Patent Application No. 62/684,806 filed Jun. 14, 2018, the contents of which are hereby incorporated in their entirety.

TECHNICAL FIELD

The present disclosure relates to apparatuses and methods for networked communications and, more particularly, to performing PHY-level hardware timestamping and time synchronization in cost-optimized environments and packet-based networks.

BACKGROUND

10BASE-T1S (10SPE) is a proposed standard currently under revision and development. 10SPE defines Ethernet local area, access and metropolitan area networks. Ethernet is specified at selected speeds of operation; and uses a common media access control (MAC) specification and management information base (MIB). The Carrier Sense Multiple Access with Collision Detection (CSMA/CD) MAC protocol specifies shared medium (half duplex) operation, as well as full duplex operation. Speed specific Media Independent Interfaces (MIIs) provide an architectural and optional implementation interface to selected Physical Layer entities (PHY). The PHY encodes frames for transmission and decodes received frames with the modulation specified for the speed of operation, transmission medium and supported link length. Other specified capabilities include: control and management protocols, and the provision of power over selected twisted pair PHY types.

10SPE specifies additions to and appropriate modifications of IEEE 802.3 to add 10 Mb/s PHY specifications and management parameters for operation, and associated optional provision of power, on single balanced twisted-pair copper cabling.

Time synchronization of clocks in distributed systems—such as those systems defined by IEEE 802.1AS (gPTP) and IEEE 1588 (Precision Time Protocol: PTP)—require the usage of specialized hardware to achieve high precision operations. These operations may include maintaining an accurate clock and timestamping packets. Current solutions offer microcontroller units (MCU) with dedicated Ethernet MAC units that perform the timestamping of packets at a MAC-level once a frame passes the MAC.

SUMMARY

In some embodiments, an apparatus includes a packet matching circuit, a hardware timer circuit, and a processor. The packet matching circuit is configured to match contents of received packets to the apparatus and identify whether a packet has been received. The hardware timer circuit is configured to provide a synchronization timestamp based on a signal from the packet matching circuit that a synchronization packet has been matched, and provide a follow-up timestamp based on a signal from the packet matching circuit that a follow-up packet has been matched after reception of the synchronization packet. The processor is configured to adjust a clock base to determine a synchronized clock base based upon the synchronization timestamp and upon the follow-up timestamp.

In other embodiments, a method includes matching, with a packet matching circuit, contents of received packets to the microcontroller and identify whether a packet has been received. The method may further include, with a hardware timer circuit, providing a synchronization timestamp based on a signal from the packet matching circuit that a synchronization packet has been matched, and providing a follow-up timestamp based on a signal from the packet matching circuit that a follow up packet has been matched after reception of the synchronization packet. The method may further include, with a processor, adjusting a clock base to determine a synchronized clock base based upon the synchronization timestamp and upon the follow-up timestamp.

In still other embodiments, a microcontroller includes a packet matching circuit, a hardware timer circuit, and a processor. The packet matching circuit is configured to match contents of received packets to the microcontroller and identify whether a packet has been received. The hardware timer circuit is configured to provide a synchronization timestamp based on a signal from the packet matching circuit that a synchronization packet has been matched, and provide a follow-up timestamp based on a signal from the packet matching circuit that a follow-up packet has been matched after reception of the synchronization packet. The processor is configured to adjust a clock base to determine a synchronized clock base based upon the synchronization timestamp and upon the follow-up timestamp.

DETAILED DESCRIPTION

Figure 1:
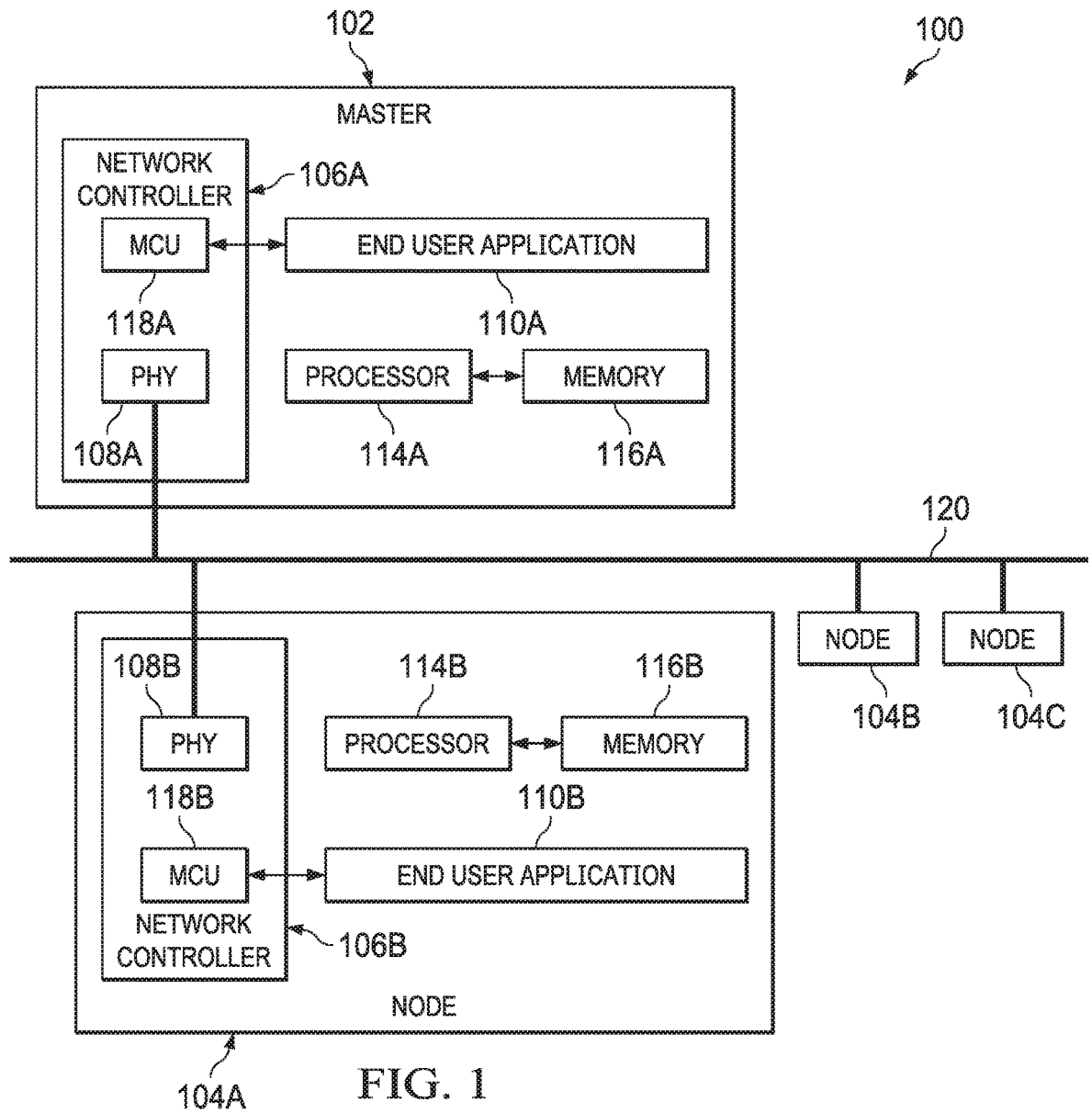
FIG. 1 is an illustration of an example 10SPE network, according to embodiments of the present disclosure.

The inventor of the embodiments of the present disclosure has found that a need exists to provide high-precision time synchronization in a packet-based network at minimum cost per node. In particular, a solution is needed to perform PHY-level hardware timestamping and time synchronization on a 10SPE network node. The timestamping and time synchronization may implement performance according to IEEE 1588 or IEEE 802.1AS. Moreover, PHY-level hardware timestamping and time synchronization may be performed on PHY hardware that is simple as the die size to implement the PHY may be limited. The PHY may be implemented without strong requirements that would limit the range of MCUs that may be selected to work with the PHY when implementing an endpoint controller.

In some embodiments, the PHY is enabled to support hardware-timestamping of PTP event messages, as required by IEEE 1588 or IEEE 802.1AS. This timestamp event may be forwarded to a further component, such as an MCU. In some embodiments, usage of an MCU's timer/counter unit may provide performance of the required tasks, without the need for any dedicated hardware. In a further embodiment, a software algorithm may be used.

As discussed in the preceding, other solutions address the timestamping either in a MAC unit. The present invention in some embodiments allows PHYs and MCUs to cooperate. In some embodiments, the PHY performs PTP event timestamping, but then simply forwards the event to the MCU. The MCU in some embodiments utilizes existing hardware (such as a timer/counter unit) to perform time-critical tasks such as measuring the timestamp and synchronization of the local clock.

According to various embodiments, high-precision time synchronization is provided for a broad range of MCUs with a common MAC unit. The common MAC unit may include a carrier-sense multiple access with collision detection (CSMA/CD) MAC. In some embodiments, a cost-sensitive timestamping feature for the PHY chip may be provided. In some embodiments, a software algorithm may be provided to utilize MCUs that do not have dedicated hardware for timestamp measurement and PTP time synchronization.

Embodiments of the present disclosure allow use of commonly available MCUs to be used as an endpoint controller. For example, an MCU with dedicated IEEE 1588 hardware might not be required. At the same time, requirements for the PHY may remain low.

Some embodiments may be particularly suited for 10SPE networks, such as in automotive and server backplane applications. In particular, in 10SPE networks and in some embodiments, it may be required to perform time synchronization at a lowest cost per network node, which in some embodiments may include a requirement for a cost-effective PHY without full IEEE 1588 support. Some features that might not be required or included may include a high-precision clock, controller, timestamping units, or event generators.

MCUs with IEEE 1588-enabled hardware might not be common and may be relatively expensive. Furthermore, timestamping is the MAC-level not achievable with the required precision if the PHY adds varying latencies to the transmitter (TX) or receiver (RX) path. Such latencies arise in 10SPE network PHY's. When PHY-level timestamping is used, such solutions implement the clock for the timestamping into the PHY, which causes a difficult problem on how to allow this clock to be utilized from the outside. This will quickly result in an overly large and complex PHY design, which enlarges development and production costs. Environments such as automotive networks make new demands on the maximum cost per node that make such solutions unusable.

In some embodiments, an apparatus includes a packet matching circuit, a hardware timer circuit, and a processor. The packet matching circuit may be implemented by a PHY or by another suitable combination of analog and digital circuitry. The hardware timing circuit may include a timer or a counter. The timer or counter may be peripherals within a microcontroller. The timer or counter peripheral may be configured to perform clock synchronization. The hardware timing circuit may, upon events or commands, store a value of the timer or circuit into any suitable storage, such as a register. The hardware timing circuit may be implemented at a hardware level of packet matching circuit. The hardware timing circuit may be implemented in part within the packet matching circuit. The packet matching circuit may be configured to match contents of received packets to the apparatus and identify whether a packet has been received. The packets may include a synchronization packet followed by a follow-up packet. The hardware timer circuit may be configured to provide a synchronization timestamp based on a signal from the packet matching circuit that the synchronization packet has been matched, and provide a follow-up timestamp based on a signal from the packet matching circuit that the follow-up packet has been matched after reception of the synchronization packet. The follow-up and synchronization packets may be implemented according to any suitable protocol. The processor may be configured to adjust a clock base to determine a synchronized clock base based upon the synchronization timestamp and upon the follow-up timestamp. The adjustment of the clock base may be further based upon clockMasterSyncInterval, syncEventEgressTimestamp, preciseOriginTimestamp, localTickPeriod, $t_r$, $t_s$, $t_d$, syncEventIngressTimestamp, syncReceiptLocalCv32, syncReceiptLocalTime, rateRatio, and followUpCorrectionField, as described further below.

In combination with any of the above embodiments, the hardware timer circuit may be separate from the packet matching circuit. In combination with any of the above embodiments, the hardware timer circuit is accessible through one or more general purpose input-output pins on a microcontroller including the processor. In combination with any of the above embodiments, the hardware timer circuit may be configured to create the synchronization and the follow-up timestamp at a level of the PHY using a clock available to software running on the processor. In combination with any of the above embodiments, the apparatus further includes an input port and an event timer, the event timer configured to provide a clock count upon receipt of an external event signal through the input port. The processor may be further configured to adjust the clock count of the external event signal based upon the synchronized clock base created by adjusting the clock base based upon the synchronization timestamp and upon the follow-up timestamp. In combination with any of the above embodiments, the synchronization packet is configured to include a sender timestamp, the follow-up packet is configured to include an adjustment timestamp, and the processor may be further configured to adjust the clock base to determine the synchronized clock base based upon applying the adjustment timestamp to the sender timestamp. In combination with any of the above embodiments, the apparatus may be included in the microcontroller.

FIG. 1 is an illustration of an example 10SPE network 100, according to embodiments of the present disclosure. Network 100 may include any suitable number and kind of nodes. For example, network 100 may include nodes 102, 104A, 104B, 104C. These nodes may be configured to communicate with each other over a network or bus 120. Network or bus 120 may be implemented in any suitable manner, such as according to the 10SPE specification or variations thereof.

Node 102 may be a master node. Node 102 may act as a master node by performing network allocation, assignments, or other management tasks on behalf of other nodes in the network.

Nodes 102, 104A, 104B, 104C may each be implemented with a network controller 106. Network controller 106 may include an MCU 118 and a PHY circuit 108. MCU 118 may be implemented by any suitable microcontroller, processor, or other computing device. PHY circuit 108 may be implemented by any suitable combination of digital or analog circuitry, an application-specific integrated circuit, field programmable gate array, or other suitable circuitry. MCU 118 may be configured to handle communication with other software or elements of the node, such as an end user application 110. PHY 108 may be configured to handle physical interfacing with network or bus 120.

Nodes 102, 104A, 104B, 104C may each be implemented with one or more end user applications 110, processors 114, and memories 116. End user applications 110 and network drivers or stacks may include software, libraries, functions, scripts, applications, code, or other instructions for execution by processors 114. The instructions may be stored on respective memories 116. The instructions, when executed by processors 114, may cause user applications to communicate with one another. Such communication may be performed by network 100 and, in particular, network controllers 106. Memories 116 may be implemented by one or more memory elements of any suitable implementation, whether long-term or short-term storage. Processors 114 may be implemented by one or more of any suitable processor, core, or microcontroller.

Nodes 102, 104A, 104B, 104C may implement any suitable electronic device, such as a computer, laptop, server, virtual machine, mobile device, sensor, or actuator. Nodes 102, 104A, 104B, 104C may include any suitable electronic device on any suitable network, such as Ethernet or a controller area network (CAN). Nodes 102, 104A, 104B, 104C may each include different implementations of end user applications 110. End user applications 110 may require communication with others of end user applications 110 or others of nodes 102, 104A, 104B, 104C. Such communication may be performed, for example using 10SPE over network or bus 120.

Although a certain number of nodes are shown in FIG. 1, network 100 may include any suitable number and combination of network nodes, such as 10SPE-enabled nodes.

10SPE networks such as network 100 may have a clock distribution direction that is master-to-client; that is, from node 102 to nodes 104. In addition, a best master clock algorithm (BMCA) that would otherwise be run by all PTP ports in a system might not be applicable to all ports of network 100. For example, the BMCA might only be operated by node 102.

Figure 2:
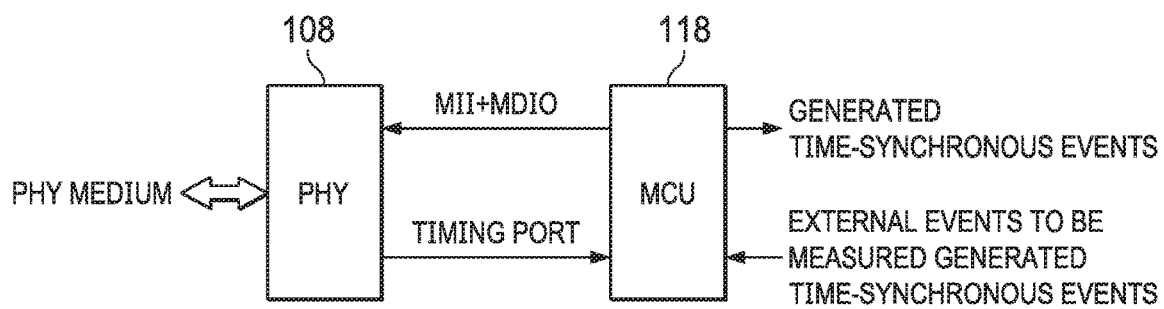
FIG. 2 illustrates a more detailed view of operation of a PHY and an MCU in a network controller, according to embodiments of the present disclosure.

FIG. 2 illustrates a more detailed view of operation of a PHY and an MCU in a network controller, according to embodiments of the present disclosure. PHY 108 and MCU 118 may be configured to communicate with one another. PHY 108 may be connected to a port of MCU 118. PHY 108 may be connected to any suitable port of MCU 118, such as a media independent interface (MII), a reduced MII (RMII), or a serial peripheral interface (SPI). PHY 108 may receive instructions or data from MCU 118 through such a port. PHY 108 may include a timing port to send information to MCU 118. Such a timing port may be implemented with one or more general-purpose input/output (GPIO) pins. In one embodiment, these pins may be configured to be used as timing or timestamping event pins to send such events from PHY 108 to MCU 118. PHY 108 may be configured to interface with physical media of network 120.

MCU 118 may be configured to initialize and configure PHY 108. MCU 118 may be configured to enable timestamping features in PHY 108 and to configure one or more packet recognition patterns in PHY 108. According to some embodiments, PHY 108 may be configured to scan ingress or egress octet streams on network 120 for the identified frame patterns. Such frame patterns may include, for example, an offset, mask, and value. An example of such a frame pattern may be, for example, matching a type of the frame and a first byte of a header. The mask may filter out bits of a frame that are not to be considered in the pattern matching, or are otherwise irrelevant. The patterns may be scanned for in ingress, egress, or ingress/egress octet data streams. According to some embodiments, when a pattern is matched, PHY 108 may be configured to raise an event signal MCU 118. The event signal may be raised on an assigned GPIO pin of the timing port. In one embodiment, it may be required that the time between recognition or receipt of a start frame delimiter (SFD) and a generated event signal is a constant value. Multiple patterns may be evaluated by PHY 108. PHY 108 may be configured to issue events on different GPIO pins, or with a code on GPIO pins to identify the particular pattern that has been matched. Different GPIO pins may be used for different patterns to match. Moreover, different GPIO pins may be used for different directions. For example, in embodiment, a GPIO pin or pins may be configured to match only ingress patterns, and another GPIO pin or pins may be configured to match only egress patterns. In such an event, egress matches and ingress matches may occur asynchronously with respect to one another, and the inclusion of separate event lines for ingress and egress matching provides an MCU 118 the opportunity to assign a recognized event to the proper message. Different GPIO pins, each representing a different possible match, may be logically OR'd together. Thus, a single input may be raised on MCU 118 if PHY 108 matches one of several possible patterns.

MCU 118 may be configured to generate time synchronous events to other elements of the node. Furthermore, MCU 118 may be configured to receive external events from other elements of the node that are to be measured. These may be measured by PHY 108.

Figure 3:
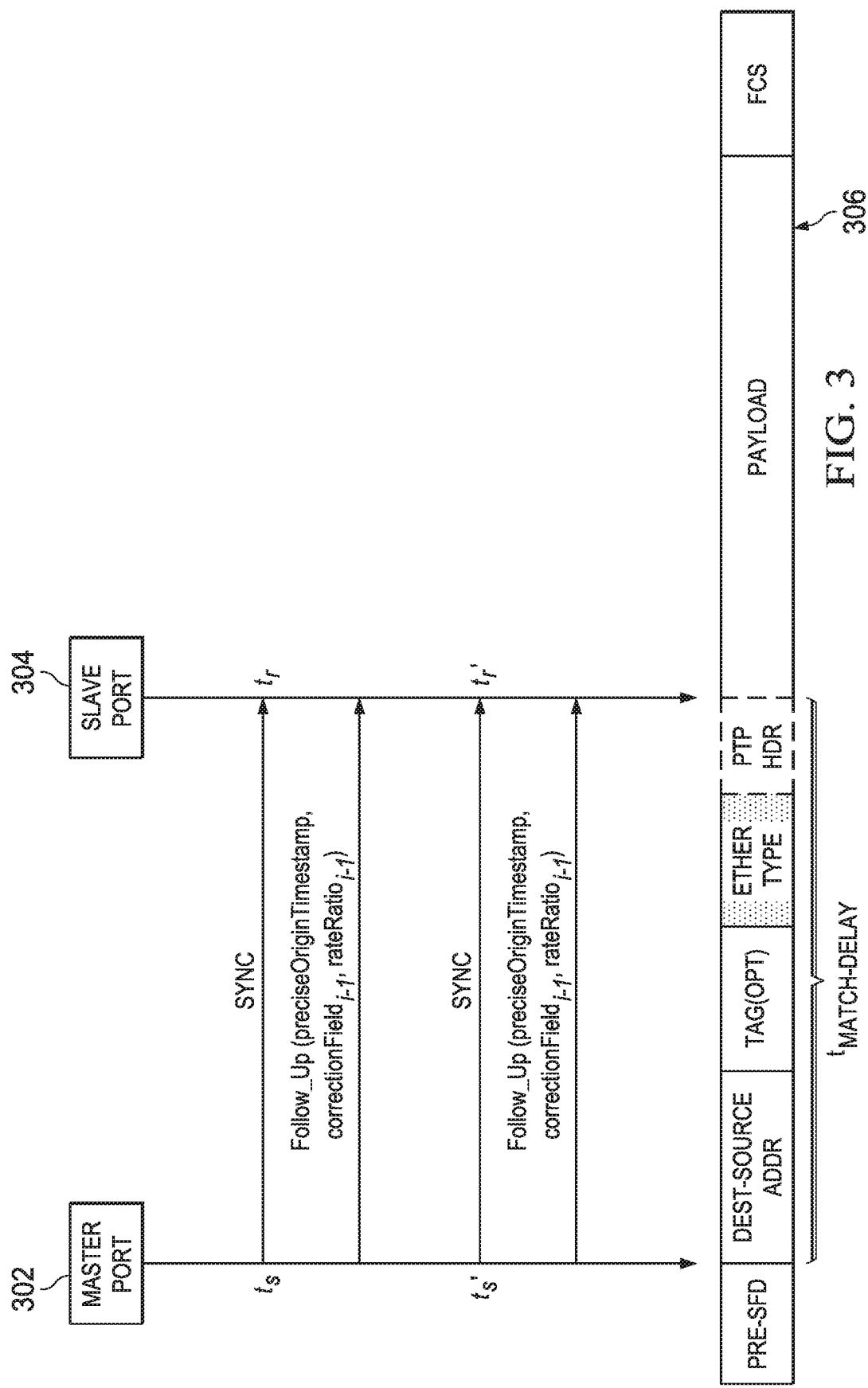
FIG. 3 illustrates a matching pattern as applied to a synch event message, according to embodiments of the present disclosure.

FIG. 3 illustrates a matching pattern as applied to an IEEE 802.1AS PTP Sync event message, according to embodiments of the present disclosure. Illustrated in FIG. 3 are operations of a master port 302 of a first node (such as a port of node 102) and a client node 304, such as a port of node 104. FIG. 3 also illustrates an example frame 306 of communication between various nodes that may be generated by node 102 and sent to node 104. Frame 306 may include a pre-SFD field, a destination and source address field, an optional tag field, an EtherType field to indicate which protocol is encapsulated in the frame, a PTP header field, a payload, and a frame check sequence (FCS) field. Frame 306 may implement, for example, a standard Ethernet frame. The payload may transport any suitable data. For example, they payload may transport a gPTP event message according to IEEE 802.1AS. Other frame formats and payloads may be used.

Illustrated is example data that is sent from port 302 and is received at port 304. Port 302 may be a master port and port 304 may be a slave port. A two-step operation is shown, wherein a sync packet is sent, and then a follow-up packet is sent. Thus, a sync packet may be sent at time $t_s$ from port 302 and received at port 304 at time $t_r$. Afterwards, a follow-up packet may be sent. The follow-up packet may include any suitable timing information. Contents of the follow-up packet may be used to forward an origin grandmaster time, which may include the moment that the sync packet left a grandmaster port (a port that sent the message to port 302), as well as the residence time on transmission lines and time for each hop (on every network bridge between grandmaster and the destination node). FIG. 3 illustrates a simplified network, where the master node and port may be the same as the grandmaster node and port. In such a case, the master node may be only communicating $t_s$ in the follow-up packet, while all other values are unused. However, if the master node and port is not the source of the grandmaster time itself, then the master node may be connected to a time-aware bridge. While the sync packet is traversing the bridge, the residence time may be computer. When the follow-up packet is sent, this residence may be added in correction fields included in the follow-up packet. It is also possible that the master node is also a slave node on another network, and consequently the master node synchronizes its own time to the grandmaster time from this other network. Then, the master node may operate as a PTP master, forwarding the synchronized time to a 10SPE network. The follow-up packet may include fields such as a preciseOriginTimeStamp, correction field, and rate ratio according to IEEE 802.1AS. The correction field contains any residence time (or propagation time) through network switches/bridges. Port 302 (of node 102) may issue PTP sync messages at a fixed rate, such as eight times per second. These sync messages may be sent to all connected ports 304 (of various nodes 104).

In other solutions for PTP, a propagation delay measurement may be performed that measures the propagation delay between neighboring ports. A stable propagation delay might not impact time synchronization but may affect phase alignment at clocks of nodes 104. For example, the more accurate the propagation delay between port 102 and port 104, the more accurate the phase alignment can be. A stable propagation delay may include implementations wherein the propagation delay is constant on the physical medium between port 102 and port 104, without including jitter or changing randomly. In one embodiment, propagation delay measurements may be replaced by a constant value for transmitter directions. Thus, propagation delay measurements may be disabled in 10SPE networks in embodiments of the present disclosure.

In one embodiment, an exemplary pattern may require matching at least the EtherType and the subsequent first payload byte. Such a subsequent first payload byte may be the "mt_ts" field inside the gPTP header. IEEE 1588 allows further message formats. MCU 118 may be configured to apply any suitable pattern matching to watch for such message formats. Depending upon the message format, the pattern may be relatively large, or different patterns may be searched for in parallel. Any suitable pattern mask and value field of any sizes may be used. It is possible to have a pattern for all PTP events, or to change the pattern to match only a single specific PTP event. For simple applications, only PTP Sync might be matched. For more complex applications, other PTP events may be required to be measured and matched, such as Pdelay (frequently performed measurements between each two neighboring nodes in IEEE 802.1AS). Thus, the delay in requesting or responding, known as PdelayReq and PdelayResp events, can be timestamped and matched. In some embodiments and in case of a master controller such as in node 102, upon a match the GPIO signal from PHY 108 may arise on time $t_s$ plus a constant delay of $t_d$. In some embodiments and in case of a client controller as node 104, upon a match the GPIO signal from PHY 108 will arise on time $t_r$ plus a constant delay of $t_d$. In some embodiments, in case of a PTP event transmission, the GPIO signal from PHY 108 will arise on time $t_s$ plus a constant delay of $t_d$. In some embodiments, in case of a PTP event reception, the GPIO signal from PHY 108 will arise on time $t_r$ plus a constant delay of $t_d$. For the PdelayReq and PdelayResp event pair there is a special case, where a pair of egress request and ingress response, or a pair of ingress request and egress response may can share the same GPIO signal from PHY 108. In such a case, a match for a PdelayReq will drive the signal high, while a match for the PdelayResp will remove the signal in turn. In any case, the GPIO signal from PHY 108 may arise at such times in order to complete packet recognition in logic inside PHY 108. Any matching event can be delayed, in relation to the desired timestamping point, as it may be the frame SFD, but this shift must be a constant value of $t_d$. A consumer of the event may know this delay value to correct the measured event timestamp.

Figure 4:
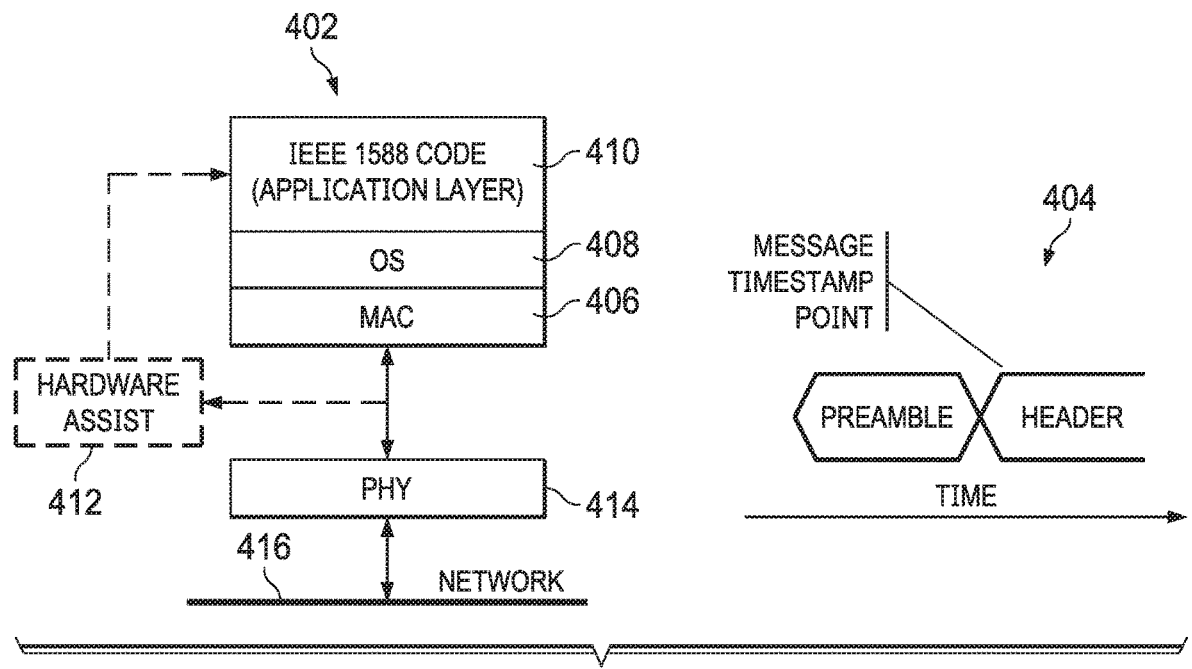
FIG. 4 illustrates use of a hardware assistance circuit for timing and timestamping operations, according to embodiments of the present disclosure.

FIG. 4 illustrates use of a hardware assistance circuit for timing and timestamping operations, according to embodiments of the present disclosure.

MCU 402 may include a hierarchy of elements in a given node. The node may include elements operating on MCU 402 such as software at an application layer 410. The software may include software for IEEE 1588. Application layer 410 may interface through an operating system 408 and a MAC 406 to a PHY 414. PHY 414 may communicate with other nodes through network 416.

In one embodiment, the node may include a hardware assist circuit 412. Hardware assist circuit 412 may identify where timestamping may be performed and that such a timestamp may be forwarded to software running, for example, on application layer 410. In a further embodiment, hardware assist circuit 412 may be implemented by PHY 414 in hardware.

In contrast to other network solutions, timestamps, once generated, might not be processed by a PHY such as PHY 414. Instead, PHY 414 may forward timestamps to MCU 402. MCU 402, may perform timestamp measurement and clock synchronization through, for example, software on application layer 410. Accordingly, MCU 402 might not need dedicated hardware to perform, for example, IEEE 1588 operations. MCU 402 may include a general-purpose timer or counter unit or circuit. Such a circuit may be configured to measure time and frequencies of external events. The circuit may be used to perform timestamp measurement. Consequently, a software consumer of the timestamp information may perform clock synchronization.

Hardware assist circuit 412 may be implemented in any suitable manner. Hardware assist circuit 412 may include timer or counter peripherals of MCU 402. Hardware assist circuit 412 may include the time port of PHY 414. The timer or counter may be implemented by, for example, a free-running 32-bit counter. Such a counter may overflow upon reaching $2^{32}$ and returning to 0. However, such a counter might not otherwise reset or modify its value other than incrementing. Instead, hardware assist circuit 412 may perform a capture of such a counter at a specific point in time to mark an event. The capture may be defined by, for example, a negative, positive, or negative-or-positive edge from an external signal, such as from PHY 414. The captured 32-bit value will then be accessible by MCU 402 or the controller through register or memory access. In other examples, the timer or counter may include a 32-bit counter that is configurable in that it can be reset on-demand, or started or stopped on-demand. Such on-demand behavior may be performed using, for example, a negative, positive, or negative-or-positive edge from an external signal, such as from PHY 414 or MCU 402. When software running on MCU 402 needs a timestamp from the counter, the software may read the current timer value to retrieve a number of clock ticks since the last event. In yet another example, a timer might use an external clock from MCU 402 or another source, and might be gated by events from PHY 414. In this example, the counter might count clock ticks only while a signal from PHY 414 is enabled. The software of MCU 402 may read the counter and reset it. In any such cases, an input capture circuit on MCU 402 may be configured to capture counter values from the timer based upon receipt of an external event from GPIO pins on PHY 414. Rising or falling edges may be used for triggering the capture. In one embodiment, the timer can be configured to reset on such external events. The captured timer value in clock ticks may be used to determine the timestamping point, necessary to perform time synchronization. PHY 414 may be configured to perform timestamping with hardware assist 412, but not before the given pattern has been matched. In one embodiment, the timestamping point may be at the start of a frame (SOF). Accordingly, when a timestamp event from PHY 414 arrives, the time to be stamped has already passed. Thus, the time distance between the desired timestamping point (at SOF) and at the actual PHY timestamping point (after the pattern has matched) may be calculated or assumed as a constant value, given as $t_d$. Using this value, the original, desired timestamping point can be reconstructed in software, even if it was reported after it was received.

The measurement from the timer or counter may be a number of clock cycles or ticks. The clock cycle or tick duration depends in turn on the chosen local clock source. The number of clock cycles or ticks may be such a number that have been recorded in between two external events from PHY 414. A size of the counter or timer may be sufficient to hold, for example, at least four seconds before an overflow occurs. In other examples, the size of the counter or timer can be sized to hold more or less than four seconds, depending upon the specific application. Multiple timers or counters may be used for each timing function.

An overflow interrupt can be used to extend the range of the timer or counter. To do so, upon an overflow of the timer or counter, an interrupt may be generated, and the interrupt may cause a software counter to increment. The software counter may be the upper bits of the entire, combined counter, while the lower bits may be the hardware timer or counter. Subsequently, when reading values from the counter, additional effort may be needed to synchronize reading values or resetting values in or from the lower and upper bits in hardware and software.

Hardware assist circuit 412 may be implemented partially within PHY 414 or outside of PHY 414. Other solutions using timestamping within PHY 414 with a clock within PHY 414 might be unable to use the same clock from outside of PHY 414. Instead, hardware assist circuit 412, implemented in part or not using timer-counter peripherals of MCU 402, may utilize a clock available to the entire microcontroller system. Thus, values of counters stored by hardware assist circuit 412 may be usable to adjust such a system-wide clock for further use of the clock.

Figure 5:
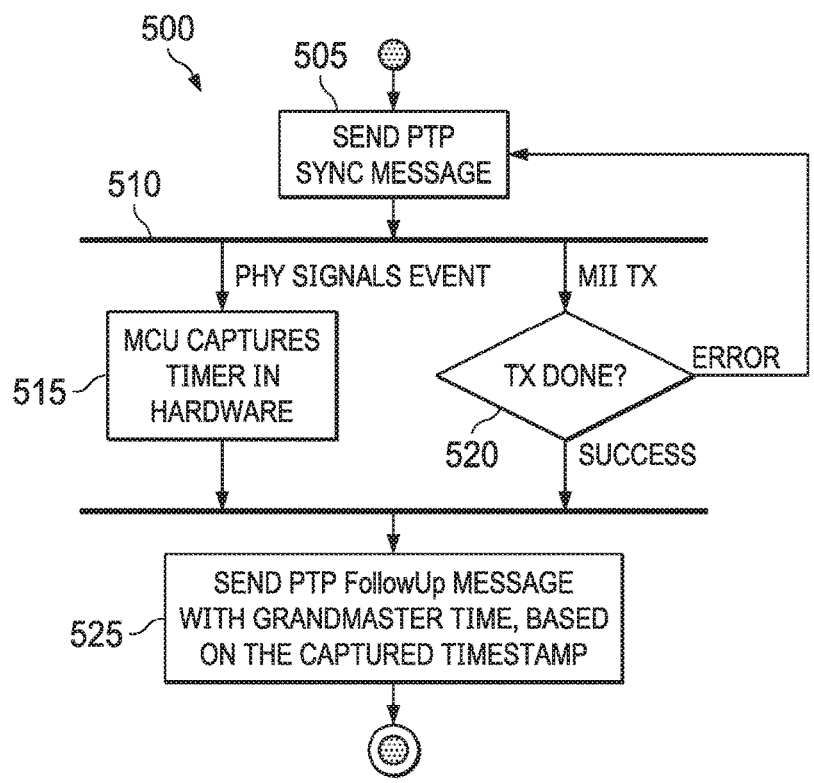
FIG. 5 illustrates a flow chart of an exemplary node setup from the perspective of a master node, according to embodiments of the present disclosure.

FIG. 5 illustrates a flow chart 500 of an exemplary node setup from the perspective of a master node, according to embodiments of the present disclosure. The setup may be for any suitable node, such as a PTP node according to any suitable time synchronization methods operating in a two-step mode. A timer or counter of the node in the respective hardware assist circuit 412 may be configured to access a local clock source. The timer or counter may be a free running 32-bit counter, running from the local clock source. The local clock source may be, for example, a minimum of 25 MHz with a frequency accuracy of +/−100 parts per million (ppm). The period of the local clock and thus time for a given clock tick may be given as localTickPeriod, and may be expressed in nanoseconds with sub-nanosecond accuracy. This may be derived from the frequency of the local clock source.

At 505, a PTP sync frame may be initiated on at a fixed, configurable rate, given by clockMasterSyncInterval, such as one hertz. In automotive applications, the rate may be six or eight hertz. During startup, higher rates, such as thirty hertz may be used to speed up synchronization. The frame may be sent on transmit bus to other nodes. The PTP sync frames may be sent at a fixed, configurable rate, given by clockMasterSyncInterval. At 510, on each frame transmitted, the PHY of the node may signal an event to the MCU of the node that the sync frame was recognized while being sent. On each Sync frame transmitted, the PHY of the node may signal with an external event generated by the PHY, as one part of the hardware assist circuit. The event may be used to record a precise timestamp by the hardware assist circuit at 515. The timestamp may be of the form of a counter value. The timestamp may indicate the time at which the frame leaves the PHY. The current counter value may be recorded as syncEventEgressTimestamp, which may later be used by the MCU to determine a precise master time of the PHY event.

In parallel with 510 and 515, the MCU may be transmitting until transmission is done. If an error occurs, it may be reported and the process of generating a sync message may be repeated. Once transmission is done, 520 may be performed.

At 520, a PTP follow-up frame corresponding to the PTP sync frame may be sent. The follow-up frame may be sent with a master (or, as appropriate, grandmaster) time based upon the captured timestamp. Software running in the MCU may read and use the previously captured timer counter value, syncEventEgressTimestamp. The value may be transformed into a timestamp compliant with the IEEE 802.1AS, with units of nanoseconds since epoch (given as time since Jan. 1, 1970). Before such a transformation, the value may simply be an absolute quantity of clock ticks relative to any other zero time. A time of the follow-up frame might not be used. A preciseOriginTimestamp value may be included inside the PTP follow-up frame, which may be analogous to syncEventEgressTimestamp of the sync frame. syncEventEgressTimestamp may be converted into an IEEE 802.1AS timestamp, which is then used as preciseOriginTimestamp for the follow-up frame. The syncEventEgressTimestamp may be converted into preciseOriginTimestamp by converting it into nanoseconds by multiplying it with the localTickPeriod constant, corrected by applying a timestamping point offset shift by $t_d$. The timestamping point offset may be an offset shift by the time $t_d$, as shown in FIG. 3 at element 306, to correct the timestamping point. The timestamping point required by IEEE 802.1AS may be shown in FIG. 4 at 404. The PHY will be timestamp-delayed, as only after the packet is recognized in the receiver will there be a match. This may happen during the first bytes of the payload. Since this offset shift may be fixed, depending on the fixed bitrate used, the measured timestamp may be corrected by subtracting the constant value $t_d$ to correct it to the required timestamping point. The result may also be adjusted according to a zero offset shift, which may translate the time from time since a last system start to time since epoch. The results may be a PTP timestamp. The PTP timestamp may include a seconds counter (of, for example 48 bits) and of a nanoseconds counter (of, for example, 30 bits). All other values inside the follow-up frame may be a constant.

During the execution of flow chart 500, the MCU may manage timing and clocking for purposes of IEEE 1588, including handling timer overflows, keeping track of the upper half (>32 bits) of the time, and increment a counter inside the timer interrupt request queue on overflows.

Figure 6:
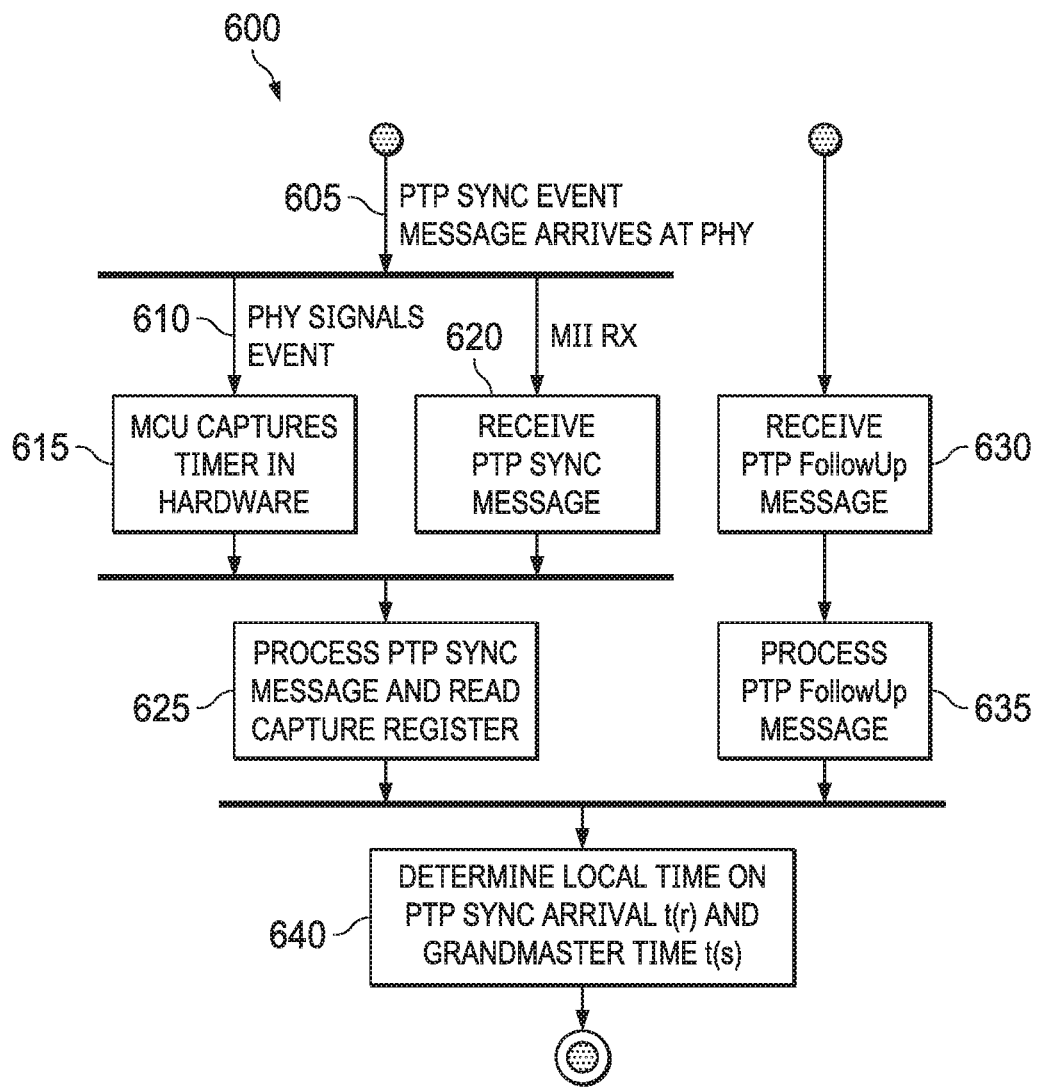
FIG. 6 illustrates a flow chart of an exemplary node setup from the perspective of a client node, according to embodiments of the present disclosure.

FIG. 6 illustrates a flow chart 600 of an exemplary node setup from the perspective of a client node, according to embodiments of the present disclosure. The setup may be for any suitable node, such as a PTP node according to IEEE 802.1AS or IEEE 1588, or other time synchronization methods operating in a one-step or two-step mode. A timer or counter of the node in the respective hardware assist circuit 412 may be configured to access a local clock source. The timer or counter may be a free running 32-bit counter, running from the local clock source. The local clock source may be, for example, a minimum of 25 MHz with a frequency accuracy of +/− 100 parts per million (ppm). The period of the local clock and thus time for a given click may be given as localTickPeriod, and may be expressed in nanoseconds with sub-nanosecond accuracy. This may be derived from the frequency of the local clock source.

At 605, a PTP sync event may be received at the PHY of the client node. At 610, the PHY may send a signal to the MCU, as one part of the hardware assist circuit. At 615, a timestamp value may be captured from a timer in the MCU, to complete the hardware assist circuit. In parallel, the PHY may start transmission of the sync frame and MCU will receive the message in 620.

At 625, the timestamp may be read by the MCU. The timestamp may be referred to as syncEventIngressTimestamp or syncReceiptLocalCv32 (to denote that a 32-bit counter value is used, that it requires further processing, and that it may be manipulated by other Cv32 values further below) and may be analogous to the egress timestamp used above. From this value, syncReceiptLocalTime may be derived after normalization into nanoseconds (wherein it is multiplied by localTickPeriod) and applying a zero offset shift and a timestamping point offset shift by $t_d$ to correct the timestamping point.

At 630, a PTP follow-up message may be received, and at 635 the follow-up message may be processed. From the PTP follow-up frame, the fields preciseOriginTimestamp, rateRatio and followUpCorrectionField may be received. The value followUpCorrectionField contains the propagation delay of the sync event message through all bridges between master and this slave. On each hop the propagation delay gets added. RateRatio may be the ratio of the last node to the grandmaster. PreciseOriginTimestamp may have been calculated at the sender, and may be the timestamp when the sync message left the grandmaster node, and may be the syncEventEgressTimestamp at the master node. FollowUpCorrectionField may include delay information about upstream delay, which may be the grandmaster time relative to our local syncEventIngressTimestamp. The correction field plus the precise origin timestamp plus the upstream delay may be the correct time At 640, the previously captured times may be used to perform further calculations to update synchronization with its own local clock, given as TargetClock. These may be performed, for example, according to IEEE 802.1AS. For example, syncReceiptTime=preciseOriginTimestamp+followUpCorrectionField+neighborPropDelay*(rateRatio/neighborRateRatio)+delayAsymmetry as defined in IEEE 802.1AS-2011, FIG. 10-9. NeighborPropDelay and NeighborRateRatio are results from running Pdelay measurements on the slave node. Such measurements may be performed with timer/counter peripherals, but can also be replaced by constants. NeighborPropDelay is the upstream delay of the local port and the neighboring port, through which sync has traversed. NeighborRateRatio is the ratio between the local clock and the clock of the neighboring node, through which sync has traversed. DelayAsymmetry is the asymmetry in the propagation delay on the link attached to this port relative to the grandmaster time base.

In some embodiments, if the slave does not perform Pdelay measurements and is thus unable to collect neighborPropDelay and neighborRateRatio values, this calculation may be simplified to be syncReceiptTime=preciseOriginTimestamp+followUpCorrectionField+config$_{neighborPropDelay}$ wherein config$_{neighborpropDelay}$ is a configurable constant time duration with sub-nanosecond precision. Such a constant may already include any delay asymmetry corrections for the receive path.

Finally, the slave node must compute a value for gmRateRatio according to IEEE 802.1AS, which is the measured ratio of the frequency of the clock source of the master to the frequency of the local clock entity. This may be performed over a sequence of consecutive sync parameters, each depicted below by an apostrophe, wherein an apostrophe indicates a subsequent sync parameter instance:

gmRateRatio=(syncReceiptTime'−syncReceiptTime)/(syncReceiptLocalTime'−syncReceiptLocalTime)

or gmRateRatio=(syncReceiptTime'−syncReceiptTime)/((syncReceiptLocalCv32'−syncReceiptLocalCv32)mod $2^{32}$)*localTickPeriod for a 32-bit counter. The modulo operation may be adjusted for different bit resolutions to be mod $2^s$, wherein s is the bit size of the counter. A tuple of synchronization parameters may be updated as a result of this synchronization process: (syncReceiptTime, syncReceiptLocalTime, syncReceiptLocalCv32, gmRateRatio).

Once time has been synchronized in 640, the synchronized time may be used in any suitable manner. The synchronized time may be applied to various time-related operations. Events may be generated at any given grandmaster time, or events may be time-stamped using the synchronized clock.

For example, an external event may be timestamped by the peripheral using the synchronized clock. The event may be routed to the peripheral by, for example, a GPIO pin, peripheral pin on the MCU, or any other suitable routing mechanism. The peripheral may be configured to watch for the event and to access the synchronized clock to timestamp the event. For example, a sensor controller in an automotive network may first use the methods of FIG. 6 to synchronize to an external clock. Subsequently, the sensor controller may timestamp events such as an electrical event from a connected sensor switch. The precise timestamp may be sent along with an indication of the event to other nodes in the network. In such an example, a timer-counter peripheral may be configured to monitor for such events in hardware and, upon the incoming signal edge, transform a captured value of the timer into a timestamp relative to grandmaster time base, so that other time-aware nodes can properly use the timestamp. This time stamp may be given as eventCaptureTime.

The peripheral may be configured to capture the 32-bit counter on the event E and implement a handler to read a captured value of the counter or timer and store it as eventCaptureLocalCv32. The following calculation may be performed to bring the measured time into relation to the grandmaster time, using the parameters from the last update of the clock synchronization process of FIG. 6

$$eventCaptureTime=(((eventCaptureLocalCv32-syncReceiptLocalCv32) \bmod 2^{32})*localTickPeriod*gmRateRatio)+syncReceiptTime$$

In order to perform synchronized event generation, the external event E must be generated at the given event Trigger Time, in relation to grandmaster time base, by creating a signal edge on an MCU output pin related to E. This may be performed by a timer-counter peripheral of the hardware assist circuit that can be programmed to trigger or toggle an output signal on a match of counter comparisons. The peripheral may include a comparator that, when the timer or clock value matches a programmed threshold, generates the event. To program the threshold value, given as eventTriggerLocalCv32, the given eventTriggerTime must be transformed first:

$$eventTriggerLocalCv32=(((eventTriggerTime-syncReceiptTime)/gmRateRatio/localTickPeriod)+syncReceiptLocalCv32) \bmod 2^{32}$$

given that event time is in the near future. On a match of this value to the value of the timer or counter, an interrupt can be triggered. In addition, the peripheral may be freed for other use.

In some embodiments, a hybrid approach may be enabled. For example, if one path has a fixed latency, it may be time-stamped in a MAC layer. Other paths that have a variable latency may be time-stamped at the PHY.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

I claim:

1. An apparatus, comprising:
a packet matching circuit configured to match contents of received packets to the apparatus and identify whether a packet has been received;
a hardware timer circuit configured to:
provide a synchronization timestamp based on a signal from the packet matching circuit that a synchronization packet has been matched; and
provide a follow-up timestamp based on a signal from the packet matching circuit that a follow-up packet has been matched after reception of the synchronization packet; and
a processor configured to adjust a clock base to determine a synchronized clock base based upon the synchronization timestamp and upon the follow-up timestamp;
wherein:
the synchronization packet is configured to include a sender timestamp;
the follow-up packet is configured to include an adjustment timestamp; and
the processor is further configured to adjust the clock base to determine the synchronized clock base based upon applying the adjustment timestamp to the sender timestamp.

2. The apparatus of claim 1, wherein the hardware timer circuit is separate from the packet matching circuit.

3. The apparatus of claim 1, wherein the hardware timer circuit is accessible through one or more general purpose input-output pins on a microcontroller including the processor.

4. The apparatus of claim 1, wherein the packet matching circuit is a PHY.

5. The apparatus of claim 4, wherein the hardware timer circuit is configured to create the synchronization and the follow-up timestamp at a level of the PHY using a clock available to software running on the processor.

6. The apparatus of claim 1, wherein:
the apparatus further includes an input port and an event timer, the event timer configured to provide a clock count upon receipt of an external event signal through the input port; and
the processor is further configured to adjust the clock count of the external event signal based upon the synchronized clock base created by adjusting the clock base based upon the synchronization timestamp and upon the follow-up timestamp.

7. A microcontroller, comprising:
a packet matching circuit configured to match contents of received packets to the microcontroller and identify whether a packet has been received;
a hardware timer circuit configured to:
provide a synchronization timestamp based on a signal from the packet matching circuit that a synchronization packet has been matched; and
provide a follow-up timestamp based on a signal from the packet matching circuit that a follow-up packet has been matched after reception of the synchronization packet; and
a processor configured to adjust a clock base to determine a synchronized clock base based upon the synchronization timestamp and upon the follow-up timestamp;
wherein:
the synchronization packet is configured to include a sender timestamp;
the follow-up packet is configured to include an adjustment timestamp; and
the processor is further configured to adjust the clock base to determine the synchronized clock base based upon applying the adjustment timestamp to the sender timestamp.

8. The microcontroller of claim 7, wherein the hardware timer circuit is separate from the packet matching circuit.

9. The microcontroller of claim 7, wherein the hardware timer circuit is accessible through one or more general purpose input-output pins on the microcontroller.

10. The microcontroller of claim 7, wherein the packet matching circuit is a PHY.

11. The microcontroller of claim 10, wherein the hardware timer circuit is configured to create the synchronization and the follow-up timestamp at a level of the PHY using a clock available to software running on the processor.

12. The microcontroller of claim 7, wherein:
the apparatus further includes an input port and an event timer, the event timer configured to provide a clock count upon receipt of an external event signal through the input port; and the processor is further configured to adjust the clock count of the external event signal based upon the synchronized clock base created by adjusting the clock base based upon the synchronization timestamp and upon the follow-up timestamp.

13. A method, comprising:

matching, with a packet matching circuit, contents of received packets to the packet matching circuit and identify whether a packet has been received;

with a hardware timer circuit:
   providing a synchronization timestamp based on a signal from the packet matching circuit that a synchronization packet has been matched; and
   providing a follow-up timestamp based on a signal from the packet matching circuit that a follow-up packet has been matched after reception of the synchronization packet; and with a processor, adjusting a clock base to determine a synchronized clock base based upon the synchronization timestamp and upon the follow-up timestamp;

wherein:

the synchronization packet includes a sender timestamp;
the follow-up packet includes an adjustment timestamp; and the method further includes, with the processor, adjusting the clock base to determine the synchronized clock base based upon applying the adjustment timestamp to the sender timestamp.

14. The method of claim 13, comprising accessing the hardware timer circuit through one or more general purpose input-output pins on a microcontroller including the processor.

15. The method of claim 13, wherein the packet matching circuit is a PHY.

16. The method of claim 15, further comprising, with the hardware timer circuit, creating the synchronization and the follow-up timestamp at a level of the PHY using a clock available to software running on the processor.

17. The method of claim 13, further comprising:

with an input port and an event timer, providing a clock count upon receipt of an external event signal through the input port; and with the processor, adjusting the clock count of the external event signal based upon the synchronized clock base created by adjusting the clock base based upon the synchronization timestamp and upon the follow-up timestamp.

* * * * *